Oct. 22, 1929.   A. F. WASMUTH   1,732,782
WALL SEAT
Filed April 22, 1925
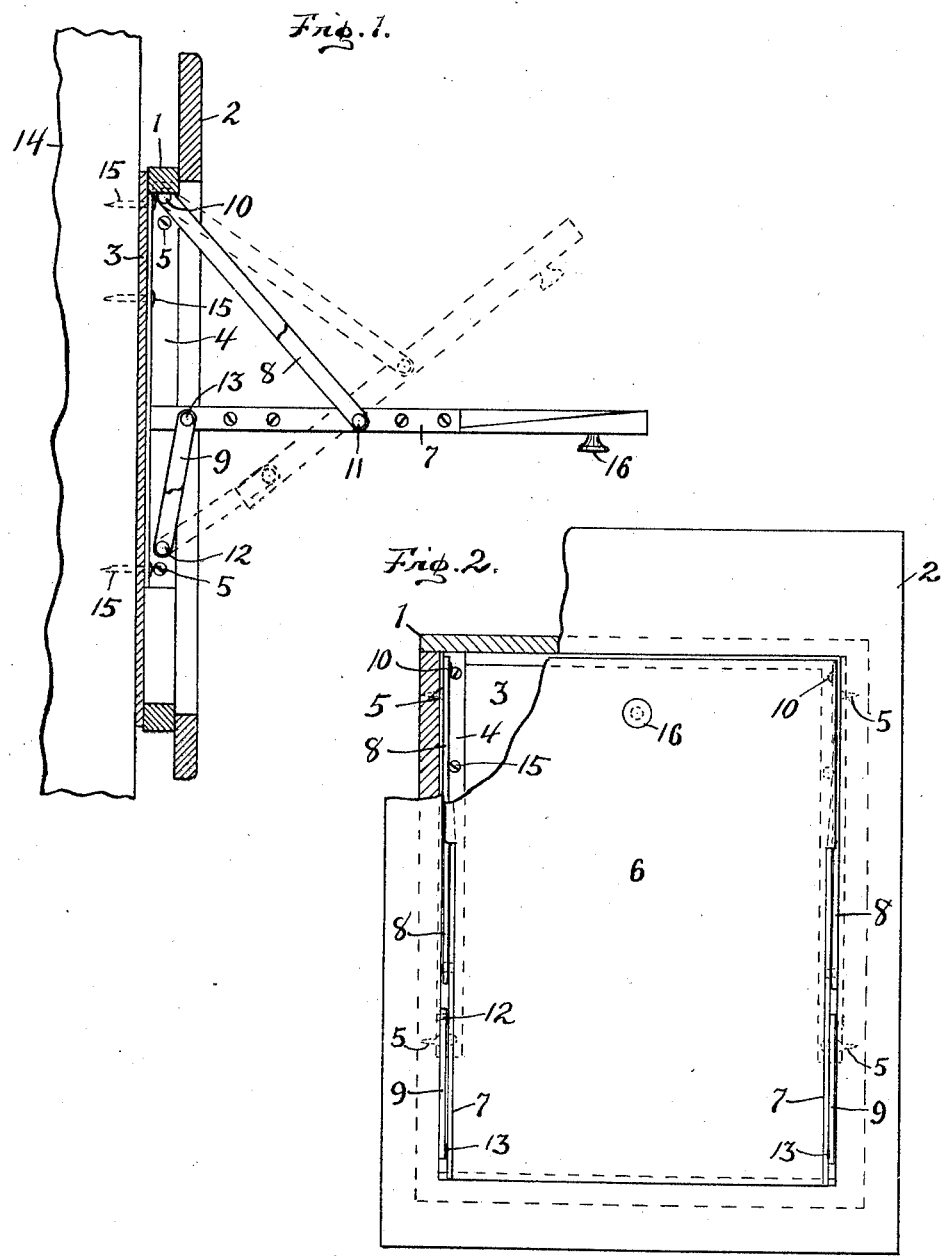
Augustus F. Wasmuth, INVENTOR
BY
A. G. Burns ATTORNEY Patented Oct. 22, 1929

1,732,782

UNITED STATES PATENT OFFICE

AUGUSTUS F. WASMUTH, OF HUNTINGTON, INDIANA

WALL SEAT

Application filed April 22, 1925. Serial No. 25,165.

This invention relates to improvements in folding wall seats especially for permanent installation in quarters of limited size, and the object of the improvement is to provide a substantial and convenient seat supported by the wall of an apartment and which may be readily disposed of in a housing therefor. Another object is to provide means for securing the housing to the wall and which also serves as a support for the folding seat.

These objects are accomplished by the construction illustrated in the accompanying drawings, in which:—

Fig. 1 is a side elevation of a structure embodying the invention, shown partly broken away; and Fig. 2 is a front elevation of the same, also shown partly broken away.

The characters appearing in the description refer to parts shown in the drawings and designated thereon by corresponding characters.

The invention comprises a rectangular frame 1 having a flange 2 extending along its sides and ends at the front thereof. The back of the frame is closed by a panel 3, and in each side of the frame is positioned a vertically disposed angle iron 4 that extends from a point near the bottom of the frame to the top thereof and bearing against the inner face of the corresponding side and panel, there being screws 5 extending through the angle iron into the adjacent side of the frame to hold it in place.

A rectangular seat 6 is shaped to fit within the flanged front of the frame, and is provided at each side with a reinforcing bar 7 permanently secured thereto. The seat has supported connection with said angle irons through the medium of two pair of swinging links 8 and 9 respectively.

The links 8 are pivoted at their upper ends respectively to the corresponding angle irons 4 near the upper ends thereof, as indicated by 10, and have pivotal connections respectively at their lower ends with the corresponding reinforcing bars 7 at the sides of the seat, as indicated by 11. The links 9 are pivotally connected at their lower ends respectively to the corresponding angle irons near the lower ends thereof, as indicated by 12, and have pivotal connections respectively at their upper ends with the corresponding reinforcing bars near the rear end of the seat, as indicated by 13. The pivotal connections of the pair of links 8 with the seat are at points spaced farther from the rear end of the seat than the pivotal connections of the links 9 with the seat so that the links 8 through their pivotal connections with the bars on the seat form a fulcrum support for the seat when in extended position while the links 9 limit the upward movement of the rear end of the seat. Also, the rear end of the seat bears against the angle irons 4 so that its swinging movement is thereby limited.

The structure thus described is secured to the studding 14 in the wall of the building by means of screws 15 that extend through the angle irons and the panel 3 into the studding. In this manner the angle irons are held in fixed relation with the studding and supoprt the frame, and also the seat through the medium of the links pivoted thereto.

In utilizing the invention the seat is sustained in horizontal position by the links 8 which limit the downward movement of the seat, and the links 9 which prevent vertical movement of the rear end thereof, and also by the angle irons against which the rear end of the seat bears, the angle irons serving as stops for the seat. When thus positioned the seat is sustained firmly while supporting the weight of the occupant. When use of the seat is not required, it may be disposed of by merely raising the outer end of the seat which will cause it to swing upon its link supports and drop back into the flanged front of the frame, closing the front thereof with the bottom surface of the seat extending in a common plane with the front surface of the flanges. A knob 16, on the bottom of the seat adjacent the outer end thereof, is provided for manipulating the seat which requires only to be pulled to swing the seat in position for use.

An especial feature of the invention is the arrangement of the angle irons so that when connected by the screws 15 to the studding, the frame and panel are secured thereby in fixed relation with the studding, and also the seat through the medium of the links receives support from the angle irons independently of the frame.

What I claim is:—

As an article of manufacture, in combination a wall cabinet having a back, sides, top and bottom, and having a flange extending therearound adapted to set against the surface of a wall; a pair of angle irons oppositely disposed within the cabinet and attached thereto; a seat of the approximate size of the opening bounded by said flange; and two pair of swinging links, one pair connecting the edges of the seat approximately midway the length thereof with the upper ends of said angle irons, and the other pair connecting the edges of the seat adjacent the rear ends thereof with the lower ends of said angle irons; whereby said seat will form a closure for said cabinet when in upended position and the said links will be housed in said cabinet.

In testimony whereof I affix my signature.

AUGUSTUS F. WASMUTH.